United States Patent
Vuornos et al.

(10) Patent No.: US 10,225,355 B2
(45) Date of Patent: Mar. 5, 2019

(54) METHODS AND SYSTEMS FOR ABUSE DETECTION OF ZERO-RATED DATA

(71) Applicant: FACEBOOK, INC., Menlo Park, CA (US)

(72) Inventors: Lauri Vuornos, Palo Alto, CA (US); Timothy Irish Bauman, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 147 days.

(21) Appl. No.: 15/479,120

(22) Filed: Apr. 4, 2017

(65) Prior Publication Data
US 2018/0288175 A1     Oct. 4, 2018

(51) Int. Cl.
| | |
|---|---|
| H04L 29/08 | (2006.01) |
| H04L 12/14 | (2006.01) |
| H04L 12/26 | (2006.01) |
| H04L 29/06 | (2006.01) |

(52) U.S. Cl.
CPC .......... *H04L 67/22* (2013.01); *H04L 12/1496* (2013.01); *H04L 43/16* (2013.01); *H04L 63/10* (2013.01); *H04L 67/306* (2013.01)

(58) Field of Classification Search
CPC ....... H04L 67/22; H04L 67/306; H04L 63/10; H04L 43/16; H04L 12/1496
See application file for complete search history.

(56) References Cited

U.S. PATENT DOCUMENTS

| | | | |
|---|---|---|---|
| 9,232,078 B1* | 1/2016 | Schentrup | H04M 15/58 |
| 10,057,230 B2* | 8/2018 | Petrack | H04L 63/08 |
| 2012/0209990 A1* | 8/2012 | Honore | H04L 12/1496 709/224 |
| 2012/0276867 A1* | 11/2012 | McNamee | H04L 12/1407 455/406 |
| 2015/0372886 A1* | 12/2015 | Paul | H04L 67/1095 709/224 |
| 2016/0191651 A1* | 6/2016 | Balakrishnan | H04L 67/2847 709/219 |
| 2016/0191664 A1* | 6/2016 | Balakrishnan | H04L 67/306 709/203 |
| 2016/0198016 A1* | 7/2016 | Tiger | H04L 47/823 709/213 |
| 2016/0210578 A1* | 7/2016 | Raleigh | G06Q 10/06375 |

(Continued)

*Primary Examiner* — Kostas J Katsikis
(74) *Attorney, Agent, or Firm* — Morgan, Lewis & Bockius, LLP

(57) ABSTRACT

A method for detecting abuse of zero-rated data includes monitoring usage patterns of a group of users for a particular data type, including zero-rated data usage by the group of users and setting a zero-rated data-usage threshold for the particular data type based at least in part on the monitored usage. The method also includes continuing to monitor the usage patterns of the group of users for the particular data type during a period of time, including the zero-rated data usage of the group of users. The method further includes determining whether a zero-rated data usage for the particular data type by a user in the group during the period of time satisfies the zero-rated threshold, and in response to determining that the zero-rated data usage by the user during the period of time satisfies the zero-rated threshold, flagging an account associated with the user as a potential abuser.

20 Claims, 6 Drawing Sheets

(56) References Cited

U.S. PATENT DOCUMENTS

| | | | |
|---|---|---|---|
| 2016/0330748 A1* | 11/2016 | Bindrim | H04L 65/1013 |
| 2017/0012955 A1* | 1/2017 | Petrack | H04L 63/08 |
| 2017/0126903 A1* | 5/2017 | Cohen | H04M 15/62 |
| 2018/0026802 A1* | 1/2018 | Barrett | H04L 41/5019 370/259 |
| 2018/0063270 A1* | 3/2018 | Naar | H04L 67/02 |
| 2018/0227302 A1* | 8/2018 | Lee | H04L 63/10 |
| 2018/0262354 A1* | 9/2018 | Vuornos | H04L 12/1425 |

\* cited by examiner

METHODS AND SYSTEMS FOR ABUSE DETECTION OF ZERO-RATED DATA

TECHNICAL FIELD

This relates generally to abuse detection on the Internet, including but not limited to abuse detection of zero-rated data on the Internet.

BACKGROUND

Internet service providers, such as social networking services, may provide zero-rated data to some of their users (e.g., provide zero-rated data to users in developing countries). Zero-rated data is data provided over a network for free, with no data charges. Proving zero-rated data to some users, however, can present opportunities for other users to abuse zero-rated data (e.g., users in developed countries seeking unlimited access to zero-rated data). Currently, internet service providers face challenges in trying to identify abusers of zero-rated data.

SUMMARY

Accordingly, there is a need for methods and systems for abuse detection of zero-rated data.

In accordance with some embodiments, a method is performed at a server system having one or more processors and memory storing instructions for execution by the one or more processors. The method includes monitoring usage patterns of a group of users for a particular data type, including zero-rated data usage by the group of users for the particular data type, and setting a zero-rated data-usage threshold for the particular data type based at least in part on the monitored usage patterns for the group of users. The method also includes continuing to monitor the usage patterns of the group of users for the particular data type during a period of time, including the zero-rated data usage of the group of users for the particular data type. The method further comprises determining whether a zero-rated data usage for the particular data type by a user in the group of users during the period of time satisfies the zero-rated data-usage threshold, and in response to determining that the zero-rated data usage by the user during the period of time satisfies the zero-rated data-usage threshold, flagging an account associated with the user as a potential zero-rated data usage abuser.

In accordance with some embodiments, a server system includes one or more processors/cores and memory storing one or more programs configured to be executed by the one or more processors/cores. The one or more programs include instructions for performing the operations of the method described above. In accordance with some embodiments, a non-transitory computer-readable storage medium has stored therein instructions that, when executed by one or more processors/cores of a server system, cause the server system to perform the operations of the method described above.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures and specification.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
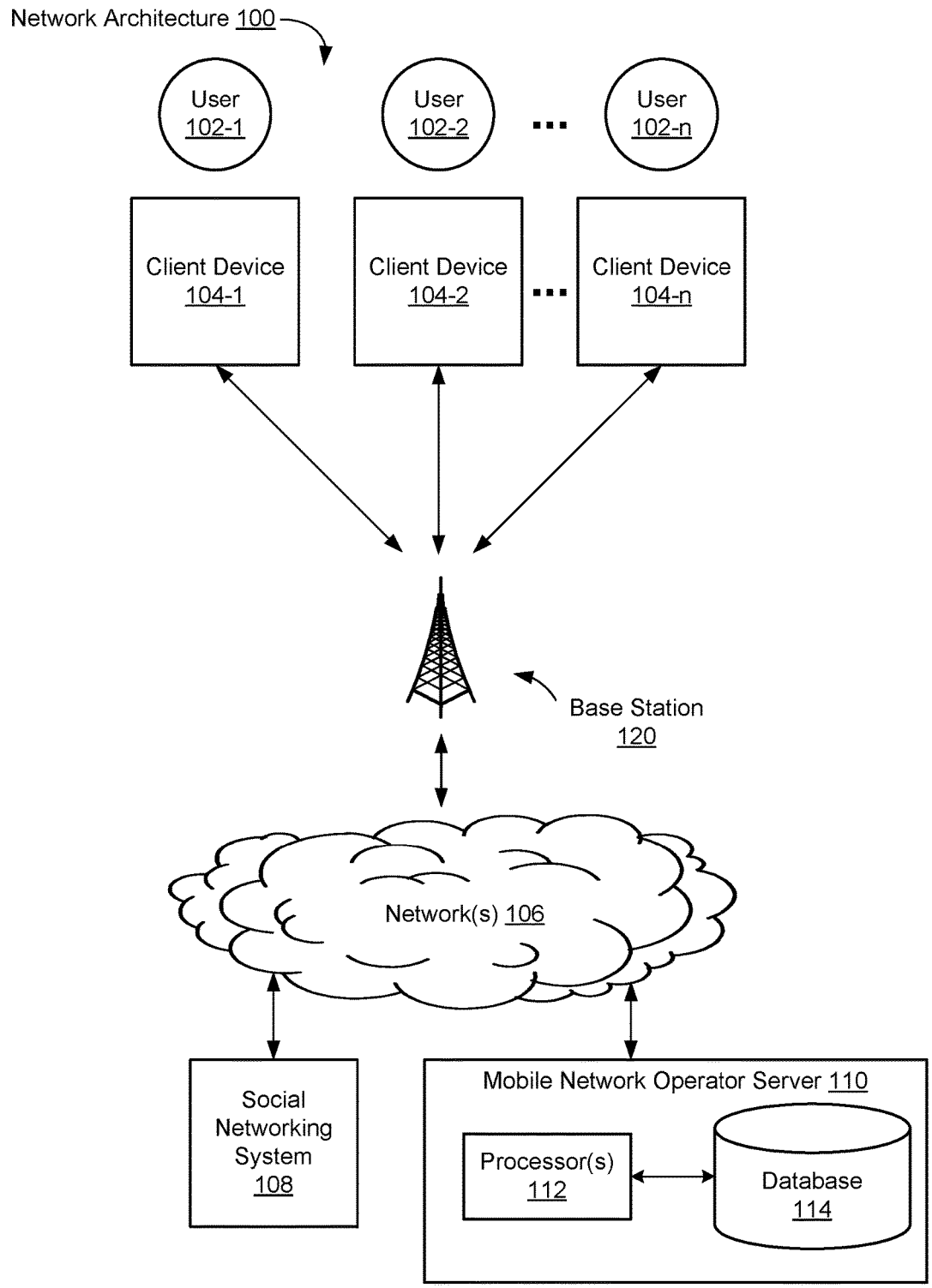
FIG. 1 is a block diagram illustrating an exemplary network architecture in accordance with some embodiments.

FIG. 1 is a block diagram illustrating an exemplary network architecture in accordance with some embodiments. The network architecture 100 includes a number of client devices (also called "client systems," "client computers," or "clients") 104-1, 104-2, . . . 104-*n* communicably connected to one or more base stations 120, which are in turn communicably connected to a social networking system 108 and at least one mobile network operator server 110 by one or more networks 106. The network architecture 100 allows the social networking system 108 to monitor usage patterns (also referred to herein as data-usage patterns) of the client devices 104-1, 104-2, . . . 104-*n* (e.g., of users 102-1, 102-2, . . . 102-*n* of the client devices 104-1, 104-2, . . . 104-*n*) and also determine if one or more client devices 104-1, 104-2, . . . 104-*n* are abusing zero-rated data (e.g., a user of a client device 104 may have discovered a technique to circumvent limits on accessing zero-rated data).

In some embodiments, the client devices 104-1, 104-2, . . . 104-*n* are computing devices such as smart watches, personal digital assistants, portable media players, smart phones, tablet computers, 2D gaming devices, 3D gaming devices, virtual reality devices, laptop computers, desktop computers, televisions with one or more processors embedded therein or coupled thereto, in-vehicle information systems (e.g., an in-car computer system that provides navigation, entertainment, and/or other information), or other appropriate computing devices that can be used to communicate with an electronic social networking system and other computing devices (e.g., via the electronic social networking system). In some embodiments, the social networking system 108 is a single computing device such as a computer server, while in other embodiments, the social networking system 108 is implemented by multiple computing devices working together to perform the actions of a server system (e.g., cloud computing). In some embodiments, the network(s) 106 is a public communication network (e.g., the Internet or a cellular data network), a private communications network (e.g., private LAN or leased lines), or a combination of such communication networks.

Users 102-1, 102-2, . . . 102-*n* employ the client devices 104-1, 104-2, . . . 104-*n* to access the social networking system 108 and to participate in a social networking service. For example, one or more of the client devices 104-1, 104-2, . . . 104-n execute web-browser applications that can be used to access the social networking service. As another example, one or more of the client devices 104-1, 104-2, . . . 104-n execute software applications that are specific to the social networking service (e.g., social networking "apps", such as a Facebook social networking application, a messaging application, etc.). In some embodiments, the social networking system 108 may monitor users employing the client devices to access the social networking service as well as other services provided by other servers. For example, the social networking system 108 may monitor zero-rated data usage by users who access a zero-rated data-usage portal provided within the social networking service.

Users interacting with the client devices 104-1, 104-2, . . . 104-n can participate in the social networking service provided by the social networking system 108 by providing and/or consuming (e.g., posting, writing, viewing, publishing, broadcasting, promoting, recommending, sharing) information, such as text comments (e.g., statuses, updates, announcements, replies, location "checks-in," private/group messages), digital content (e.g., photos (i.e., images), videos, audio files, links, documents), and/or other electronic content. For example, users interacting with the client devices can stream videos available via the social networking service (e.g., available via the zero-rated data-usage portal). In some embodiments, users provide information to a page, group, message board, feed, and/or user profile of the social networking service. Users of the social networking service can also annotate information posted by other users of the social networking service (e.g., endorsing or "liking" a posting of another user, commenting on a posting by another user, or sharing a posting of another user).

Users interacting with the client devices 104-1, 104-2, . . . 104-n can also use the social networking service provided by the social networking system 108 to define groups of users. Users interacting with the client devices 104-1, 104-2, . . . 104-n can also use the social networking service to communicate (e.g., using a messaging application or built-in feature) and collaborate with each other.

In some embodiments, as noted above, the network architecture 100 may also include at least one mobile network operator server 110 coupled to the network(s) 106. In some embodiments, the mobile network operator server 110 is implemented on one or more standalone computers or on a distributed network of computers. In some embodiments, the mobile network operator server 110 also employs various virtual devices and/or services of third-party service providers (e.g., cloud computing) to provide the underlying computing resources and/or infrastructure resources of the mobile network operator server 110. The mobile network operator server 110 includes one or more processors 112 and one or more databases 114. The one or more processors 112 process requests for respective network services from the client devices 104 (e.g., process a request to stream a video available in a zero-rated data-usage portal within the social networking service), and route or forward the requests to corresponding web servers (e.g., social networking service 108 or some other third-party server (not shown) connected to the network 106) to provide the services. In some embodiments, the mobile network operator server 110 is configured to forward or route data between the client devices 104 and the web servers on a zero-rated basis (i.e., for free, at no data charges, such as when a user accesses the zero-rated data-usage portal provided by the social networking system 108). In some embodiments, the mobile network operator server 110 is configured to forward or route data between the client devices 104 and the web servers using a predetermined pricing configuration (e.g., a predefined pricing per minute, per hour, per unit of data, etc.). The database 114 stores various information, including but not limited to information related to subscribers, information related to the network operator, and/or pricing configurations.

In some embodiments, the network architecture 100 includes one or more base stations 120 for carrier networks that provide cellular service to the client devices 104 (although a single base station 120 is shown in FIG. 1, one skilled in the art will appreciate that multiple base stations 120 may be included in the network architecture 100). One or more mobile network operators with associated servers 110 (e.g., network service providers, mobile network operators, network carriers, or cellular companies) own or control the one or more base stations 120 and related infrastructure. For example, the base station 120 communicably connects one or more client devices 104 (e.g., 104-1) to one another (e.g., 104-2, . . . 104-n) and/or to the networks 106. The base stations 120 route traffic between the networks 106 and the client devices 104-1, 104-2, . . . 104-n. Requests for respective network services from the client devices 104 are routed through the one or more base stations 120 (e.g., a request to stream video available in the zero-rated data-usage portal).

In some embodiments, the network architecture 100 may also include one or more third-party servers (not shown). In some embodiments, respective IP addresses or respective domain names associated with the one or more third-party servers have predetermined configurations for providing content to the client devices 104. For example, various pricing configurations may exist for specific content sources (e.g., pay-per-view, advertisers), specific content formats (e.g., file formats), specific content genres (e.g., games, movies, audiobooks), and specific content-distribution times (e.g., peak hours, off-peak hours). Typically, a client device 104 pays a data-usage fee to a network provider for viewing, downloading, and/or uploading data (e.g., pays X-amount of dollars per month to consume Y-amount of data for the month). However, in some circumstances, the social networking system 108 may provide a zero-rated data-usage portal within the social networking service to a predefined group of users (e.g., users that satisfy a predefined criterion, such as being located in a specific region) allowing the group of users to freely access data (e.g., video, audio, text, images, etc.) that would otherwise not be free.

Issues arise when a user (e.g., who is not part of the predefined group of users) discovers a technique to access zero-rated data with no restrictions (e.g., discovers a technique to access the zero-rated data-usage portal).

Figure 2:
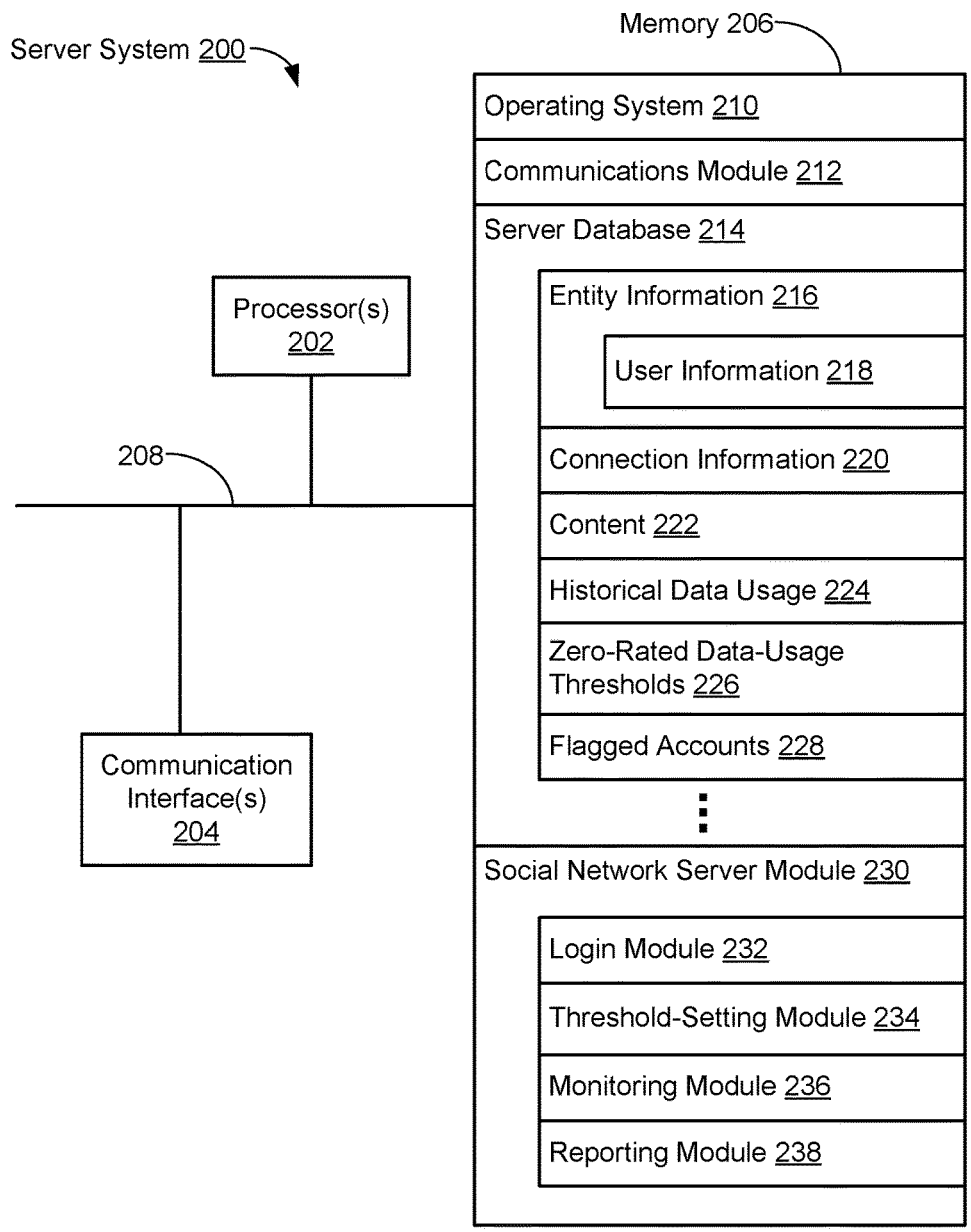
FIG. 2 is a block diagram illustrating an exemplary server system, in accordance with some embodiments.

FIG. 2 is a block diagram illustrating an exemplary server system 200 in accordance with some embodiments. In some embodiments, the server system 200 is an example of the social networking system 108 (FIG. 1). The server system 200 typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The server system 200 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display.

Figure 3:
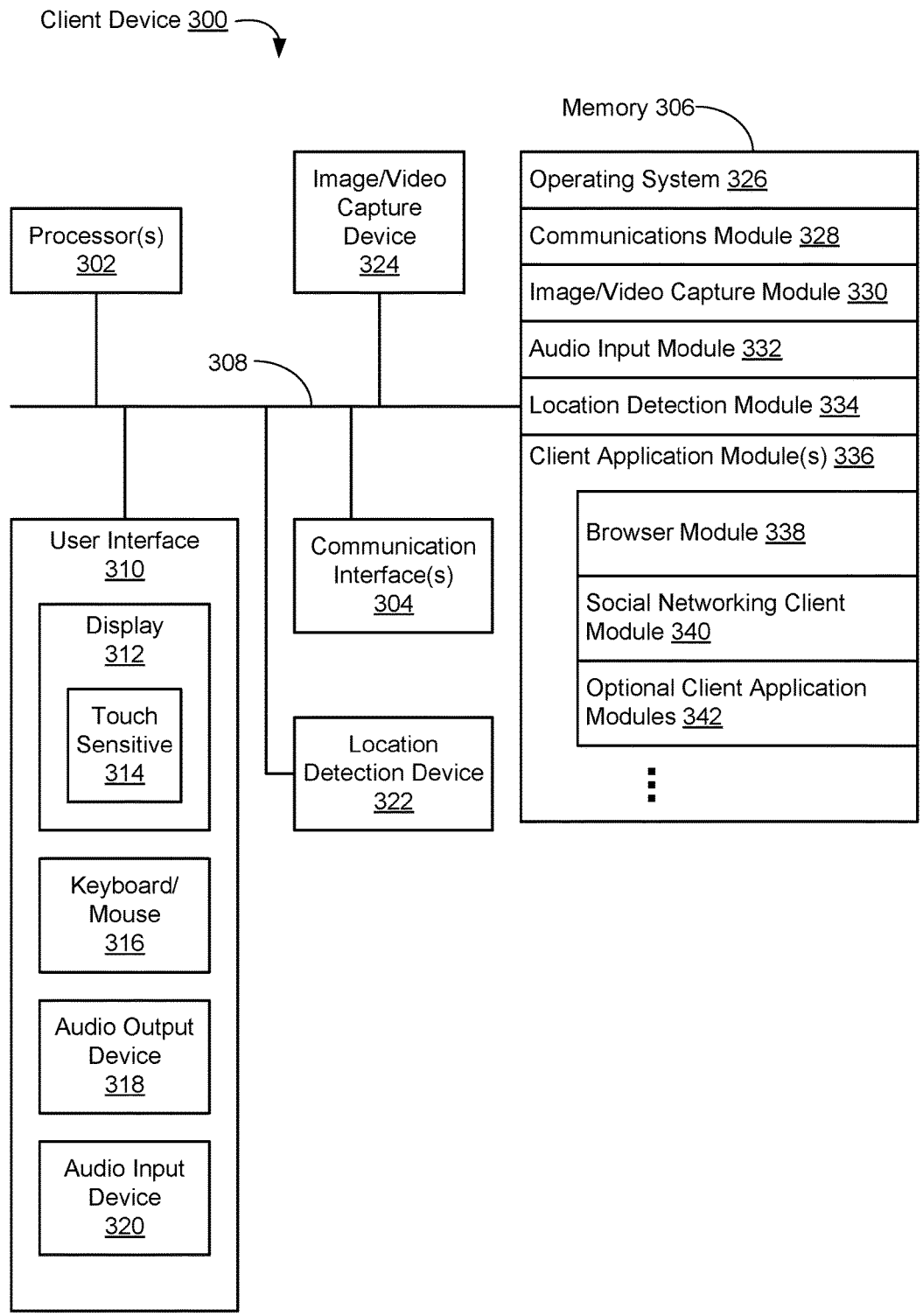
FIG. 3 is a block diagram illustrating an exemplary client device, in accordance with some embodiments.

Memory 206 includes high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the processor(s) 202. Memory 206, or alternately the non-volatile memory device(s) within memory 206, includes a non-transitory computer-readable storage medium. In some embodiments, memory 206 or the computer-readable storage medium of memory 206 stores the following programs, modules, and data structures, or a subset or superset thereof:

- an operating system 210 that includes procedures for handling various basic system services and for performing hardware-dependent tasks;
- a network communication module 212 that is used for connecting the server system 200 to other computers (e.g., client devices 104-1, 104-2, . . . 104-n, mobile network operator 110, base stations 120, FIG. 1) via the one or more communication network interfaces 204 (wired or wireless) and one or more communication networks 106 (FIG. 1);
- a server database 214 for storing data associated with the social networking service, such as:
  - entity information 216, such as user information 218, which includes content items (e.g., images, videos, etc.) and other user information (e.g., data-usage patterns);
  - connection information 220;
  - user content 222;
  - historical data usage 224 (e.g., determined usage patterns of users of the social networking service);
  - zero-rated data-usage thresholds 226; and
  - flagged accounts 228;
- a social networking server module 230 for providing social networking services and related features (e.g., in conjunction with social networking client module 340 on the client device 300, FIG. 3) (e.g., a portal such as a zero-rated data-usage portal), which includes:
  - a login module 232 for logging a user 102 at a client device 104 into the social networking system 108;
  - a threshold-setting module 234 for setting thresholds (e.g., zero-rated data-usage thresholds, historical deviation thresholds) based on monitored usage patterns of users;
  - a monitoring module 236 for monitoring usage patterns of respective users (and groups of users) of the social networking service; and
  - a reporting module 238 for providing reports on data usage.

The server database 214 stores data associated with the server system 200 in one or more types of databases, such as text, graph, dimensional, flat, hierarchical, network, object-oriented, relational, and/or XML databases.

In some embodiments, the server database 214 includes a graph database, with entity information 216 represented as nodes in the graph database and connection information 220 represented as edges in the graph database. The graph database includes a plurality of nodes, as well as a plurality of edges that define connections between corresponding nodes. In some embodiments, the nodes and/or edges themselves are data objects that include the identifiers, attributes, and information for their corresponding entities, some of which are rendered at clients 104 on corresponding profile pages or other pages in the social networking service. In some embodiments, the nodes also include pointers or references to other objects, data structures, or resources for use in rendering content in conjunction with the rendering of the pages corresponding to the respective nodes at clients 104.

Entity information 216 includes user information 218, such as user profiles, user profile pictures, other pictures associated with the user (e.g., images where the user has been tagged or identified by image analysis software), a plurality of icons, login information, payment credentials (e.g., credit-card or debit-card information, bank information, etc. for conducting financial transactions through the social networking service), privacy and other preferences, biographical data, and the like. In some embodiments, for a given user, the user information 218 includes the user's name, profile picture, a plurality of icons, contact information, birth date, sex, marital status, family status, employment, education background, preferences, interests, and/or other demographic information. In some embodiments, the user information may include other information, such as likes and comments, associated with, for example, profile pictures of the user (or other photos of the user). In some embodiments, the user information may include data-usage patterns for one or more periods of time, as noted above.

In some embodiments, entity information 216 includes information about a physical location (e.g., a restaurant, theater, landmark, city, state, or country), real or intellectual property (e.g., a sculpture, painting, movie, game, song, idea/concept, photograph, or written work), a business, a group of people, and/or a group of businesses. In some embodiments, entity information 216 includes information about a resource, such as an audio file, a video file, a digital photo, a text file, a structured document (e.g., web page), or an application. For example, entity information 216 may include a location tag (e.g., Lake Tahoe, Calif., USA) for one or more digital photos. In some embodiments, the resource is located in the social networking system 108 (e.g., in content 222) or on an external server, such as a third-party server.

In some embodiments, connection information 220 includes information about the relationships between entities in server database 214. In some embodiments, connection information 220 includes information about edges that connect pairs of nodes in the graph database. In some embodiments, an edge connecting a pair of nodes represents a relationship between the pair of nodes.

In some embodiments, an edge includes or represents one or more data objects or attributes that correspond to the relationship between a pair of nodes. For example, when a first user indicates that a second user is a "friend" of the first user, the social networking system 108 may transmit a "friend request" to the second user. If the second user confirms the "friend request," the social networking system 108 may create and store an edge connecting the first user's user node and the second user's user node in a graph database as connection information 220 that indicates that the first user and the second user are friends (e.g., also referred to herein as being "contacts"). In some embodiments, connection information 220 represents a friendship, a family relationship, a business or employment relationship, a fan relationship, a follower relationship, a visitor relationship, a subscriber relationship, a superior/subordinate relationship, a reciprocal relationship, a non-reciprocal relationship, another suitable type of relationship, or two or more such relationships.

In some embodiments, an edge between a user node and another entity node represents connection information 220 about a particular action or activity performed by a user of the user node towards the other entity node. For example, a user may "like" or have "attended," "played," "listened," "cooked," "worked at," "watched," etc. the entity at the other node. The page in the social networking service that corresponds to the entity at the other node may include, for example, a selectable "like," "check in," "add to favorites," etc. icon (e.g., an affordance). After the user clicks one of these icons, the social networking system 108 may create a "like" edge, "check in" edge, a "favorites" edge, etc. in response to the corresponding user action. As another example, the user may listen to a particular song using a particular application (e.g., an online music application). In this case, the social networking system 108 may create a "listened" edge and a "used" edge between the user node that corresponds to the user and the entity nodes that correspond to the song and the application, respectively, to indicate that the user listened to the song and used the application. In addition, the social networking system 108 may create a "played" edge between the entity nodes that correspond to the song and the application to indicate that the particular song was played by the particular application.

In some embodiments, content 222 includes text (e.g., ASCII, SGML, HTML), images (e.g., jpeg, tif and gif), graphics (e.g., vector-based or bitmap), audio (e.g., an audio file such as mp3), video (e.g., mpeg), other multimedia, and/or combinations thereof. In some embodiments, content 222 includes executable code (e.g., script for API calls), podcasts, links, and the like.

In some embodiments, the historical data usage 224 includes monitored usage patterns for respective users of the social networking service 108. The server system 200 may determine one or more usage patterns for a first user 102-1 during a period of time, one or more usage patterns for a second user 102-2 during the period of time, and so on. In some embodiments, the server system 200 (e.g., threshold-setting module 234, FIG. 2) may set one or more thresholds based, at least in part, on the usage patterns and/or the historical data usage 224.

In some embodiments, the flagged accounts 228 are accounts associated with users of the social networking service provided by the server system 200. In some embodiments, an account is flagged, and stored as being flagged in the server database 214, when monitored usage patterns for a user associated with the account satisfies one or more of the zero-rated data-usage thresholds 226. In some embodiments, a single account may be flagged two or more times (e.g., flagged for a first time when a zero-rated data-usage threshold is satisfied during a first period of time, flagged for a second time when the zero-rated data-usage threshold is satisfied during a second period of time, and so on).

In some embodiments, the monitoring module 236 is used for placing the users into particular groups based on one or more characteristics.

In some embodiments, the server database 214 further stores the periods of time. In some embodiments, the server database 214 stores one or more criteria for a predefined group of users to have access (e.g., authorized access) to zero-rated content (e.g., to the zero-rated data-usage portal).

In some embodiments, the reporting module 238 is used for disabling accounts (e.g., flagged accounts) associated with the users and/or for disabling a portal provided by the server system 200 (e.g., a zero-rated data-usage portal).

FIG. 3 is a block diagram illustrating an exemplary client device 300, in accordance with some embodiments. The client device 300 is an example of one of the client devices 104-1, 104-2, . . . 104-n (FIG. 1). The client device 300 typically includes one or more processing units (processors or cores) 302, one or more network or other communications interfaces 304, memory 306, and one or more communication buses 308 for interconnecting these components. The communication buses 308 optionally include circuitry (sometimes called a chipset) that interconnects and controls communications between system components. The client device 300 includes a user interface 310. The user interface 310 typically includes a display device 312. In some embodiments, the client device 300 includes inputs such as a keyboard, mouse, and/or other input buttons 316. Alternatively or in addition, in some embodiments, the display device 312 includes a touch-sensitive surface 314, in which case the display device 312 is a touch-sensitive display. In some embodiments, the touch-sensitive surface 314 is configured to detect various swipe gestures (e.g., continuous gestures in vertical and/or horizontal directions) and/or other gestures (e.g., single/double tap). In client devices that have a touch-sensitive display 314, a physical keyboard is optional (e.g., a soft keyboard may be displayed when keyboard entry is needed). The user interface 310 also includes an audio output device 318, such as speakers or an audio output connection connected to speakers, earphones, or headphones. Furthermore, some client devices 300 use a microphone and voice recognition to supplement or replace the keyboard. Optionally, the client device 300 includes an audio input device 320 (e.g., a microphone) to capture audio (e.g., speech from a user). Optionally, the client device 300 includes a location detection device 322, such as a GNSS (e.g., GPS, GLONASS, etc.) or other geo-location receiver, for determining the location of the client device 300. The client device 300 also optionally includes an image/video capture device 324, such as a camera, a video camera, and/or a webcam.

In some embodiments, the client device 300 includes one or more optional sensors (e.g., gyroscope, accelerometer) for detecting motion and/or a change in orientation of the client device. In some embodiments, the detected motion and/or orientation of the client device 300 (e.g., the motion/change in orientation corresponding to a user input produced by a user of the client device) is used to manipulate an interface (or content within the interface) displayed on the client device 300. In some embodiments, the one or more optional sensors may include an optical projection sensor for projecting an interface displayed on the client device 300 in 3D (e.g., project 3D hologram). Moreover, a user may manipulate the interface displayed on the client device 300 by interacting with the projected holographic 3D display.

Memory 306 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 306 may optionally include one or more storage devices remotely located from the processor(s) 302. Memory 306, or alternately the non-volatile memory device(s) within memory 306, includes a non-transitory computer-readable storage medium. In some embodiments, memory 306 or the computer-readable storage medium of memory 306 stores the following programs, modules, and data structures, or a subset or superset thereof:

- an operating system 326 that includes procedures for handling various basic system services and for performing hardware-dependent tasks;
- a network communication module 328 that is used for connecting the client device 300 to other computing devices (e.g., the mobile network operator server 110, the social networking system 108, the third-party servers, etc.) via the one or more communication network interfaces 304 (wired or wireless) and one or more communication networks (e.g., the one or more networks 106, FIG. 1);

an image/video capture module 330 (e.g., a camera module) for processing a respective image or video captured by the image/video capture device 324, where the respective image or video may be sent or streamed (e.g., by a client application module 336) to the server system 200;

an audio input module 332 (e.g., a microphone module) for processing audio captured by the audio input device 320, where the respective audio may be sent or streamed (e.g., by a client application module 336) to the server system 200;

a location detection module 334 (e.g., a GNSS, Wi-Fi, hybrid positioning module, etc.) for determining the location of the client device 300 (e.g., using the location detection device 322) and providing this location information for use in various applications (e.g., social networking client module 340); and one or more client application modules 336, including the following modules (or sets of instructions), or a subset or superset thereof:

a web-browser module 338 (e.g., Internet Explorer or Edge by Microsoft, Firefox by Mozilla, Safari by Apple, or Chrome by Google) for accessing, viewing, and interacting with web sites;

a social networking module 340 for providing an interface to a social networking service (e.g., a social networking service provided by the social networking system 108) and related features, and for loading (e.g., within the interface for the social networking module 340) pages associated with third-party service providers (e.g., to stream videos); and/or optional client application modules 342, such as applications for word processing, calendaring, mapping, weather, stocks, time keeping, virtual digital assistant, presenting, number crunching (spreadsheets), drawing, instant messaging, e mail, telephony, video conferencing, photo management, video management, a digital music player, a digital video player, 2D gaming, 3D gaming, virtual reality, electronic book reader, and/or workout support.

In some embodiments, the memory 306 stores an identifier indicating that the client device 300 is part of the one or more predefined groups having access to a zero-rated data-usage portal. In some embodiments, the identifier is received from the server system 200.

Each of the above identified modules and applications correspond to a set of executable instructions for performing one or more functions as described above and/or in the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 206 and/or 306 store a subset of the modules and data structures identified above. Furthermore, memory 206 and/or 306 optionally store additional modules and data structures not described above.

Figure 4A:
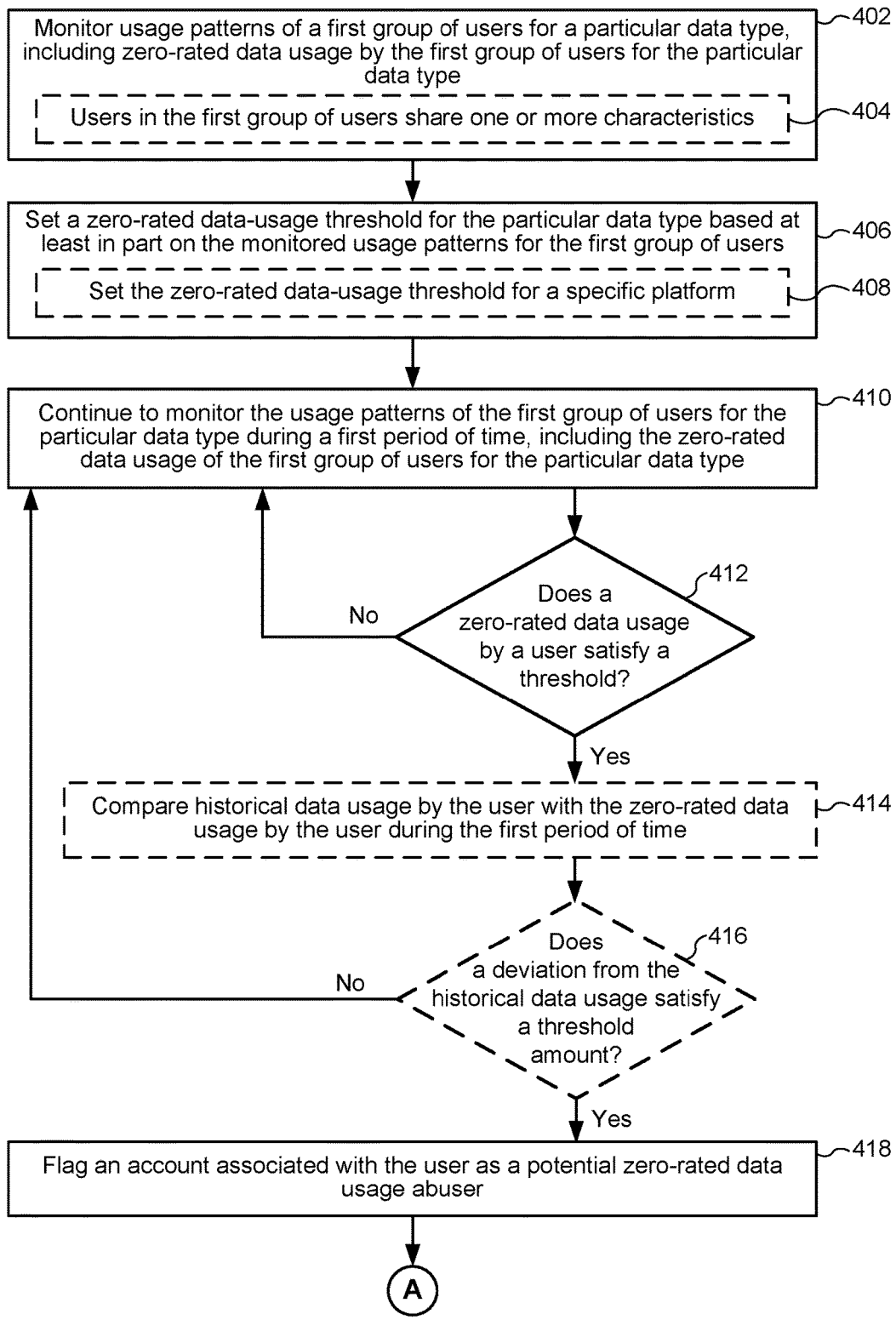
FIGS. 4A-4C are flow diagrams illustrating a method for detecting abuse of zero-rated data usage, in accordance with some embodiments.
Figure 4B:
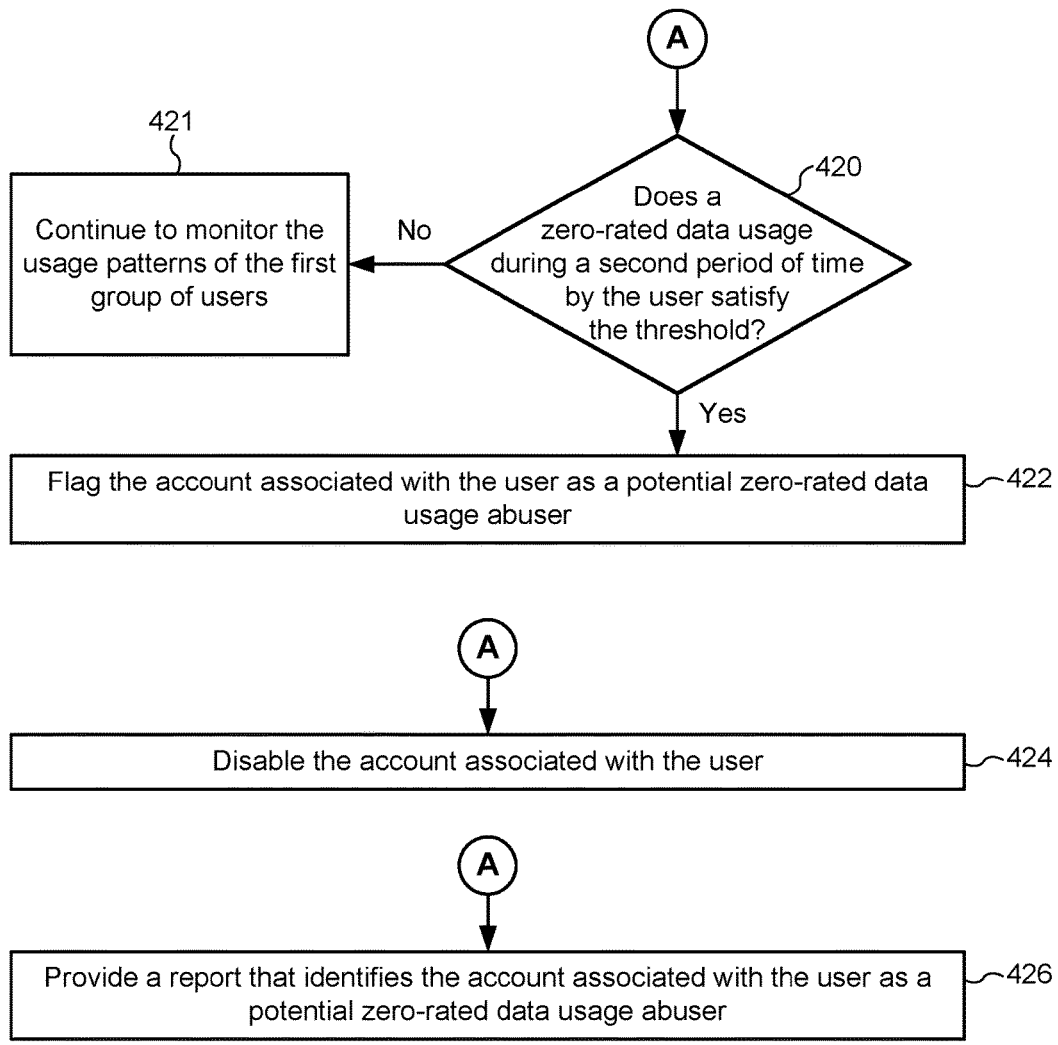
Figure 4C:
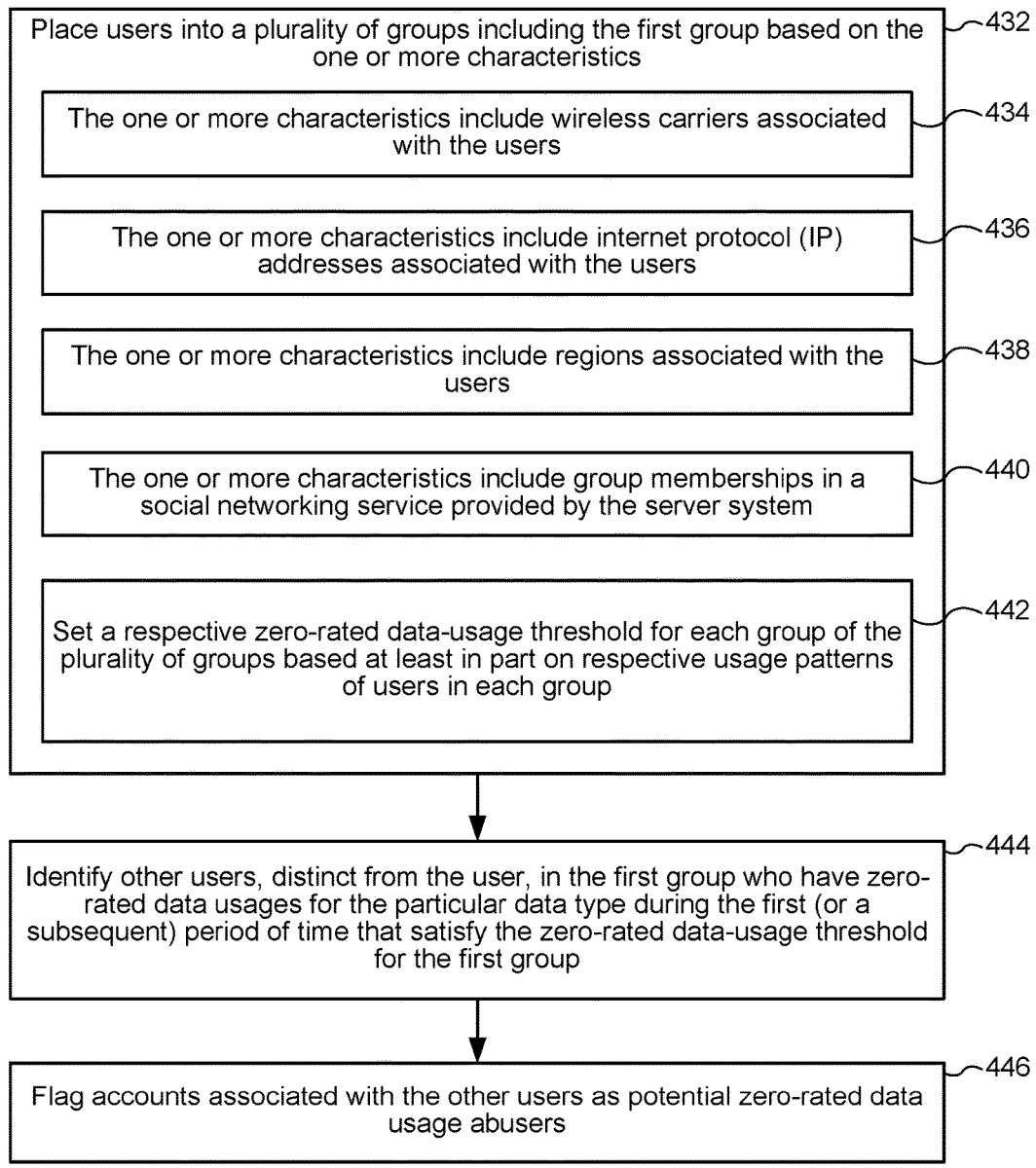

FIGS. 4A-4C are flow diagrams illustrating methods 400 (FIGS. 4A-4B) and 430 (FIG. 4C) for detecting abuse of zero-rated data, in accordance with some embodiments. The steps of the methods 400 and 430 may be performed by a server system (e.g., social networking system 108, FIG. 1; server system 200, FIG. 2). FIGS. 4A-4C correspond to instructions stored in a computer memory or computer-readable storage medium (e.g., memory 206 of the server system 200). For example, the operations of the method 400 (and the method 430) are performed, at least in part, by a social networking server module (e.g., social networking server module 300, FIG. 2).

In performing the method 400, the server system (e.g., monitoring module 236, FIG. 2) monitors (402) usage patterns of a group of users (e.g., users 102-1, 102-2, . . . 102-n, FIG. 1) for a particular data type (e.g., video, audio, text, images, etc.), including zero-rated data usage (i.e., for free, with no data charges) by the group of users for the particular data type. In some embodiments, the server system monitors usage patterns of the group of users (also referred to herein as a first group of users) when users of the group access a portal provided by the server system (e.g., a zero-rated data-usage portal). In some embodiments, the first group of users is not part of a predefined group of users (e.g., users that satisfy a predefined criterion, such as being located in a specific region) allowed unlimited access to the portal. In some embodiments, the first group of users is part of a predefined group of users allowed limited access to the portal (e.g., with data quota restriction, data-type restrictions, etc.). For example, the server system may close (i.e., cease providing access to) the portal to a user of the first group when the user consumes his or her data quota.

In some embodiments, the server system monitors usage patterns of the group of users by receiving usage pattern reports from one or more mobile network operator servers (e.g., the mobile network operator 110, FIG. 1).

In some embodiments, the zero-rated data usage of the group of users includes an amount of zero-rated data usage (e.g., a number of gigabytes). For example, after accessing the portal, client devices associated with the users load web pages and other application modules within the portal causing an amount of zero-rated data to be consumed. In some embodiments, the zero-rated data usage of the group of users includes one or more zero-rated data-usage types (e.g., video, audio, text, image, etc.). In some embodiments, the zero-rated data usage of the group of users includes use of a zero-rated data usage interface (e.g., using a certain application, web-browser application, proxy browser, etc.).

In some embodiments, the server system identifies the particular data type (and other data types) when monitoring the usage patterns of the group of users based on code included (e.g., embedded) in a web page (e.g., HTML elements, HTML attributes, and/or HTML tags related to links/resources). Examples of HTML elements, HTML attributes, and/or HTML tags related to links/resources include, but are not limited to, "a href=," "img src=," "source src=," "link href=," <img>, <link>, <style>, <audio>, <map>, <object>, and <video>. For example, client devices of the group of users may load various web pages (e.g., load the code included in the web pages) while accessing the portal provided by the server system. In this way, the server system is able to extract the particular data type for the usage patterns.

In some embodiments, users in the first group of users share one or more characteristics (404). For example, the first group of users may use a common web-browser application (e.g., Safari, Chrome, Edge, etc.). In another example, the first group of users may include users from a specific region or area (e.g., users from a specific country or state).

Characteristics and forming groups of users are discussed in further detail below with reference to step 432 of the method 430 (FIG. 4C).

The server system (e.g., threshold-setting module 234, FIG. 2) sets (406) a zero-rated data-usage threshold for the particular data type based at least in part on the monitored usage patterns for the first group of users. In some embodiments, the server system may calculate one or more statistics for the monitored usage patterns and set the zero-rated data-usage threshold for the particular data type using the one or more statistics. The one or more statistics may be, for example and without limitation, a mean associated with the monitored usage patterns (e.g., a mean amount of zero-rated data usage by the first group of users), a mode associated with the monitored usage patterns (e.g., a mode amount of zero-rated data usage by the first group of users), a median associated with the monitored usage patterns (e.g., a medium amount of zero-rated data usage by the first group of users), a standard deviation associated with the monitored usage patterns (e.g., a standard deviation of zero-rated data usage by the first group of users), a percentile associated with the monitored usage patterns (e.g., a percentile of zero-rated data usage by the first group of users), etc.

For example, the server system may calculate the mean amount and standard deviation of zero-rated data usage by the first group of users for the particular data type (e.g., video, audio, etc.), and may set the zero-rated data-usage threshold for the particular data type at a specified number of standard deviations from (e.g., above) the calculated mean (e.g., set at three standard deviations above the mean, or some greater (or some lesser) number of standard deviation(s) above the mean). In another example, instead of using standard deviations from the mean, the server system may set the zero-rated data-usage threshold at a percentile in view of the one or more statistics (e.g., set at a 90th percentile, or some greater (or some lesser) percentile).

In some embodiments, the server system forms a baseline according to the one or more statistics and the zero-rated data-usage threshold is a threshold deviation from the baseline.

In some embodiments, the server system sets (408) the zero-rated data-usage threshold for a specific platform (e.g., a zero-rated data usage interface/portal). For example, a first zero-rated data-usage threshold may be set for a first platform (e.g., accessing the social networking service provided by the server system via a software application, e.g., an "app") and a second zero-rated data-usage threshold may be set for a second platform (e.g., accessing the social networking service via a web-browser application such as Safari, Chrome, Edge, etc.).

In some circumstances or situations, an abuser of one data type (e.g., audio files) may consume far less zero-rated data relative to an amount of zero-rated data consumed by an abuser of another data type (e.g., video files). As such, in some embodiments, the server system sets a first zero-rated data-usage threshold for a first data type (e.g., audio files) and sets a second zero-rated data-usage threshold for a second data type (e.g., video files). In this way, the server system may tailor the zero-rated data-usage thresholds to specific data types, thereby allowing the server system to identify potential zero-rated data usage abusers per data type.

After setting the zero-rated data usage threshold(s), the server system continues (410) to monitor the usage patterns of the group of users for the particular data type during a first period of time (e.g., a day, a week, a month, etc.), including the zero-rated data usage of the group of users for the particular data type. In some embodiments, the server system continues to monitor the usage patterns of the group of users when the group of users access the portal provided by the server system (e.g., the zero-rated data-usage portal). Alternatively or in addition, the server system continues to monitor the usage patterns of the group by receiving additional usage pattern reports from the one or more mobile network operator servers (e.g., the mobile network operator server 110, FIG. 1).

The server system determines (412) whether a zero-rated data usage for the particular data type by a user in the group of users during the first period of time satisfies (e.g., exceeds, or equals or exceeds) the zero-rated data-usage threshold. In some embodiments, in response to determining that the zero-rated data usage by the user during the first period of time does not satisfy the zero-rated data-usage threshold (412—No), the server system continues to monitor (410) the group of users (and other groups of users).

In response to determining that the zero-rated data usage by the user during the first period of time satisfies the zero-rated data-usage threshold (412—Yes), the server system flags (418) an account associated with the user as a potential zero-rated data usage abuser (e.g., flags the account as having an abnormal data-usage pattern). For example, the group of users may be members of a social networking service provided by the server system (as discussed above) and the account of the user is for the social networking service. In some embodiments, flagging the account results in a message being sent to the account of the user (e.g., the server system sends a notification to the account of the user). In some embodiments, the flagged account is stored in memory of the server system (e.g., flagged accounts 228, FIG. 2). In some embodiments, the server system marks the flagged account with an indicator of the first period of time. In this way, the server system can determine from which period of time and/or how many times, an account has been flagged (discussed in more detail below).

In some embodiments, prior to flagging the account associated with the user, the server system compares (414) historical data usage by the user with the zero-rated data usage by the user during the first period of time. The server system determines (416) whether a deviation of the zero-rated data usage by the user during the first period of time from the historical data usage by the user satisfies a threshold amount. In some embodiments, flagging (418) the account associated with the user is performed in response to determining that the deviation of the zero-rated data usage by the user during the first period of time from the historical data usage by the user satisfies the threshold amount (416—Yes). The server system may conduct the comparison, for example, to determine if the zero-rated data usage by the user during the first period of time is part of a trend (e.g., if zero-rated data usage by the user in the past is similar to current zero-rated data usage by the user) or is instead an anomaly (e.g., a single spike in zero-rated data usage by the user, which may indicate that a system glitch permitted temporary access to the zero-rated content). In some embodiments, when the server system determines that the zero-rated data usage by the user may be an anomaly, the server system may proceed to step 420 (FIG. 4B) to gather additional data. In addition or alternatively, the server system may proceed to step 420 even when the server system determines that the zero-rated data usage by the user during the first period of time is not an anomaly (e.g., may be part of a trend).

In some embodiments, the server system determines (420) whether a zero-rated data usage by the user during a second period of time for the particular data type satisfies the zero-rated data-usage threshold (e.g., the server system continues to monitor usage patterns of the group of users for the particular data type during the second period of time, and even a third period of time, and so on). The second period of time is subsequent to the first period of time. In some embodiments, the first and second periods of time are sequential periods of time.

In some embodiments, in response to determining that the zero-rated data usage by the user during the second period of time does not satisfy the zero-rated data-usage threshold (420—No), the server system continues to monitor (421) the data usage patterns of the first group of users. In addition, the server system may determine that the spike in zero-rated data usage by the user during the first period of time was an anomaly (e.g., a system glitch). However, in some embodiments, a record of the account having been flagged account associated with the user remains stored in memory of the server system. In some embodiments, the server system unflags the account (e.g., removes the first indicator from the account) associated with user in response to determining that the zero-rated data usage by the user during the second period of time does not satisfy the zero-rated data-usage threshold.

In some embodiments, in response to determining that the zero-rated data usage by the user during the second period of time satisfies the zero-rated data-usage threshold (420—Yes), the server system flags (422) the account associated with the user as a potential zero-rated data usage abuser (e.g., flags the account for a second time). In some embodiments, flagging the account for the second time results in another message being sent to the account of the user (e.g., the server system sends a second notification to the user). In some embodiments, the account is again stored as being flagged in the memory of the server system (e.g., flagged accounts 228, FIG. 2). In some embodiments, the server system marks the flagged account from the second period of time with an indicator of the second period of time. In this way, the server system can determine that the account has been flagged during two periods of time (e.g., two sequential periods of time). Such a result indicates that the spike in zero-rated data usage by the user is likely not attributable to a system glitch (e.g., not attributable to a temporary server-side issue such as permitting temporary access to the portal).

In some embodiments, the server system disables (424) the flagged account. In some embodiments, the server system disables the flagged account after flagging the account at step 418 or at step 422 (e.g., after satisfying the zero-rated data-usage threshold during the first and second periods of time). In some embodiments, the server system disables accounts marked with the first indicator. Alternatively, in some embodiments, the server system disables accounts marked with the first and second indicators.

Alternatively or in addition, in some embodiments, the server system provides (426) a report that identifies the flagged account associated with the user as a potential zero-rated data usage abuser. In some embodiments, the server system provides the report after flagging the account associated with the user at step 418 (e.g., after satisfying the zero-rated data-usage threshold during the first period of time) or at step 422 (e.g., after satisfying the zero-rated data-usage threshold during the first and second periods of time).

In some embodiments, the method 400 may include the method 430 (FIG. 4C). The steps of the method 430 may be performed in conjunction with the steps of the method 400.

In performing the method 430, the server system places (432) users into a plurality of groups including the first group based on the one or more characteristics. As noted above, the users in the first group share one or more characteristics. In addition, users in each of the plurality of groups share one or more characteristics. In some embodiments, the one or more characteristics include wireless carriers associated with the users (434). For example, a first group of the plurality of groups may be associated with a first wireless carrier, a second group of the plurality of groups may be associated with a second wireless carrier, and so on.

In some embodiments, the one or more characteristics include internet protocol (IP) addresses associated with the users (436). For example, a first group of the plurality of groups may be associated with a first set (e.g., block) of IP addresses, a second group of the plurality of groups may be associated with a second set (e.g., block) of IP addresses, and so on.

In some embodiments, the one or more characteristics include regions associated with the users (438). For example, a first group of the plurality of groups may be associated with a first region, a second group of the plurality of groups may be associated with a second region, and so on.

In some embodiments, the one or more characteristics include group memberships in the social networking service provided by the server system (440). For example, a first group of the plurality of groups may be associated with a first group membership in the social networking service, a second group of the plurality of groups may be associated with a second group membership in the social networking service, and so on.

In some embodiments, the server system places users into the plurality of groups using a combination of the characteristics. For example, a first group of the plurality of groups may be associated with a first combination of wireless carrier and country, a second group of the plurality of groups may be associated with a second combination of wireless carrier and country. Other combinations of characteristics may be used to place users into the plurality of groups.

In some embodiments, the server system sets (442) a respective zero-rated data-usage threshold for each group of the plurality of groups based at least in part on respective usage patterns of users in each group. For example, a first zero-rated data-usage threshold may be set for a first group of the plurality of groups based at least in part on usage patterns of users in the first group and a second zero-rated data-usage threshold may be set for a second group of the plurality of groups based at least in part on usage patterns of users in the second group. In some embodiments, the first and second zero-rated data-usage thresholds are the same. In some embodiments, the first and second zero-rated data-usage thresholds differ.

In some embodiments, the server system identifies other users (444), distinct from the user of steps 412-426 (FIGS. 4A-4B), in the first group who have zero-rated data usages for the particular data type during the first period of time (or a subsequent period of time, e.g., the second period of time) that satisfy the zero-rated data-usage threshold. In response to identifying the other users, the server system flags (446) accounts associated with the other users as potential zero-rated data usage abusers (e.g., flags the accounts as having abnormal data-usage patterns). In some embodiments, flagging the accounts results in individual messages being sent to the accounts of the other users (e.g., the server system sends individual notifications to the users). In some embodiments, the flagged accounts are stored as being flagged in the memory of the server system along with the account associated with the user (e.g., in flagged accounts 228, FIG. 2). In some embodiments, the server system marks the flagged accounts from the first period of time with first indicators.

In some embodiments, after identifying the other users, the server system may determine respective degrees of association between the user and the other users (for ease of discussion, the user will be referred to as the first user). For example, to determine a respective degree of association between users, the server system may determine whether a connection (e.g., an edge) between the first user (e.g., a first node) and a second user (e.g., a second node) exists (the second user being one of the other users). For example, a connection exists when the first user and the second user are contacts (e.g., friends) on the social networking service provided by the server system. In another example, a connection exists when the first user and the second user work(ed) together. By determine respective degrees of association between the first user and one or more of the other users, the server system may identify a core group of users abusing zero-rated data (e.g., abusing zero-rated data by accessing, without authorization, the portal provided by the server system).

In some embodiments, after identifying the first user and the other users (now referred to as a first set of users) during the first period of time, the server system identifies a second set of users in the first group who have zero-rated data usages for the particular data type during the second period of time that satisfy the zero-rated data-usage threshold. In addition, the server system may compare the first set of users identified during the first period of time with the second set of users identified during the second period of time. In some embodiments, the first set of users and the second set of users include the same users. In such a case, the server system may disable accounts associated with these users (and the first user as discussed above). Alternatively or in addition, the server system may provide one or more reports identifying the accounts associated with these users as potential zero-rated data usage abusers.

In some embodiments, the first set of users identified during the first period of time differs from the second set of users identified during the second period of time. For example, the second set of users may include the first set of users and additional users not included in the first set of users. Such a result indicates an increase in potential zero-rated data usage abusers within the first group from the first period of time to the second period of time. The increase could further indicate that a technique originally developed by the first set of users (or simply the first user) to abuse zero-rated data may be spreading within the first group, and perhaps to other groups.

Accordingly, in some embodiments, the server system disables the portal provided by the server system in response to determining that the number of users satisfying the zero-rated data-usage threshold grew by a threshold amount from the first period of time to the second period of time. In this way, the server system may cease providing zero-rated data until the technique being used to abuse zero-rated data is identified and accounted for.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

It will also be understood that, although the terms first, second, etc. are, in some instances, used herein to describe various elements, these elements should not be limited by these terms. These terms are used only to distinguish one element from another. For example, a first period of time could be termed a second period of time, and, similarly, a second period of time could be termed a first period of time, without departing from the scope of the various described embodiments. The first period of time and the second period of time are both periods of time, but they are not the same periods of time, unless specified otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

What is claimed is:
1. A method, comprising:
   at a server system having one or more processors and memory storing instructions for execution by the one or more processors:
   monitoring usage patterns of a group of users for a particular data type, including zero-rated data usage by the group of users for the particular data type;
   setting a zero-rated data-usage threshold for the particular data type based at least in part on the monitored usage patterns for the group of users;

continuing to monitor the usage patterns of the group of users for the particular data type during a period of time, including the zero-rated data usage of the group of users for the particular data type;

determining whether a zero-rated data usage for the particular data type by a user in the group of users during the period of time satisfies the zero-rated data-usage threshold; and in response to determining that the zero-rated data usage by the user during the period of time satisfies the zero-rated data-usage threshold, flagging an account associated with the user as a potential zero-rated data usage abuser.

2. The method of claim 1, further comprising, at the server system:

comparing historical data usage by the user with the zero-rated data usage by the user during the period of time, wherein flagging the account associated with the user is performed in response to determining that a deviation of the zero-rated data usage by the user during the period of time from the historical data usage by the user satisfies a threshold amount.

3. The method of claim 1, wherein the period of time is a first period of time and the method further comprises, at the server system:

determining whether a zero-rated data usage by the user during a second period of time for the particular data type satisfies the zero-rated data-usage threshold, the second period of time being subsequent to the first period of time; and flagging the account associated with the user as a potential zero-rated data usage abuser in response to determining that the zero-rated data usage by the user during the second period of time satisfies the zero-rated data-usage threshold.

4. The method of claim 1, wherein:

the group of users is a first group of users sharing one or more characteristics; and the method further comprises, at the server system, placing users into a plurality of groups including the first group based on the one or more characteristics.

5. The method of claim 4, further comprising, at the server system:

identifying other users, distinct from the user, in the first group who have zero-rated data usages for the particular data type during the period of time that satisfy the zero-rated data-usage threshold; and in response to identifying the other users, flagging accounts associated with the other users as potential zero-rated data usage abusers.

6. The method of claim 4, wherein the one or more characteristics include wireless carriers associated with the users.

7. The method of claim 4, wherein the one or more characteristics include internet protocol (IP) addresses associated with the users.

8. The method of claim 4, wherein the one or more characteristics include regions associated with the users.

9. The method of claim 4, wherein the one or more characteristics include group memberships in a social networking service provided by the server system.

10. The method of claim 4, wherein the zero-rated data-usage threshold is a first zero-rated data-usage threshold and the method further comprises, at the server system, setting a respective zero-rated data-usage threshold for each group of the plurality of groups based at least in part on respective usage patterns of users in each group.

11. The method of claim 1, wherein setting the zero-rated data-usage threshold comprises setting the zero-rated data-usage threshold for a specific platform.

12. The method of claim 1, wherein:

the group of users are members of a social networking service provided by the server system; and the account of the user is for the social networking service.

13. The method of claim 1, further comprising, at the server system, in response to determining that the zero-rated data usage by the user satisfies the zero-rated data-usage threshold, disabling the account associated with the user.

14. The method of claim 1, further comprising, at the server system, providing a report that identifies the account associated with the user as a potential zero-rated data usage abuser.

15. A server system, comprising:

one or more processors; and memory storing one or more programs for execution by the one or more processors, the one or more programs including instructions for:

monitoring usage patterns of a group of users for a particular data type, including zero-rated data usage by the group of users for the particular data type;

setting a zero-rated data-usage threshold for the particular data type based at least in part on the monitored usage patterns for the group of users;

continuing to monitor the usage patterns of the group of users for the particular data type during a period of time, including the zero-rated data usage of the group of users for the particular data type;

determining whether a zero-rated data usage for the particular data type by a user in the group of users during the period of time satisfies the zero-rated data-usage threshold; and in response to determining that the zero-rated data usage by the user during the period of time satisfies the zero-rated data-usage threshold, flagging an account associated with the user as a potential zero-rated data usage abuser.

16. The server system of claim 15, wherein the one or more programs further include instructions for:

comparing historical data usage by the user with the zero-rated data usage by the user during the period of time, wherein flagging the account associated with the user is performed in response to determining that a deviation of the zero-rated data usage by the user during the period of time from the historical data usage by the user satisfies a threshold amount.

17. The server system of claim 15, wherein the period of time is a first period of time and the one or more programs further including instructions for:

determining whether a zero-rated data usage by the user during a second period of time for the particular data type satisfies the zero-rated data-usage threshold, the second period of time being subsequent to the first period of time; and flagging the account associated with the user as a potential zero-rated data usage abuser in response to determining that the zero-rated data usage by the user during the second period of time satisfies the zero-rated data-usage threshold.

18. The server system of claim 15, wherein:
the group of users are members of a social networking service provided by the server system; and
the account of the user is for the social networking service.

19. The server system of claim 15, wherein the one or more programs further include instructions for disabling the account associated with the user in response to determining that the zero-rated data usage by the user satisfies the zero-rated data-usage threshold.

20. A non-transitory computer-readable storage medium, storing one or more programs configured for execution by one or more processors of a server system, the one or more programs including instructions, which when executed by the one or more processors cause the server system to:
monitor usage patterns of a group of users for a particular data type, including zero-rated data usage by the group of users for the particular data type;
set a zero-rated data-usage threshold for the particular data type based at least in part on the monitored usage patterns for the group of users;
continue to monitor the usage patterns of the group of users for the particular data type during a period of time, including the zero-rated data usage of the group of users for the particular data type;
determine whether a zero-rated data usage for the particular data type by a user in the group of users during the period of time satisfies the zero-rated data-usage threshold; and
in response to determining that the zero-rated data usage by the user during the period of time satisfies the zero-rated data-usage threshold, flag an account associated with the user as a potential zero-rated data usage abuser.

* * * * *

UNITED STATES PATENT AND TRADEMARK OFFICE
CERTIFICATE OF CORRECTION

PATENT NO. : 10,225,355 B2
APPLICATION NO. : 15/479120
DATED : March 5, 2019
INVENTOR(S) : Vuornos et al.

It is certified that error appears in the above-identified patent and that said Letters Patent is hereby corrected as shown below:

In the Claims

Claim 17, Column 18, Line 55, please delete "including" and insert --include--.

Signed and Sealed this
Fourteenth Day of May, 2019

Andrei Iancu
*Director of the United States Patent and Trademark Office*